July 26, 1960 R. WESTBURY 2,946,194
CONSTANT SPEED UNITS
Filed Jan. 14, 1959 6 Sheets-Sheet 1

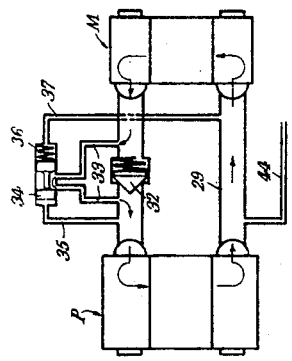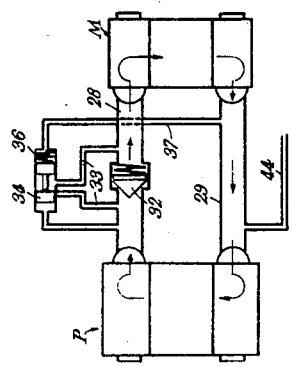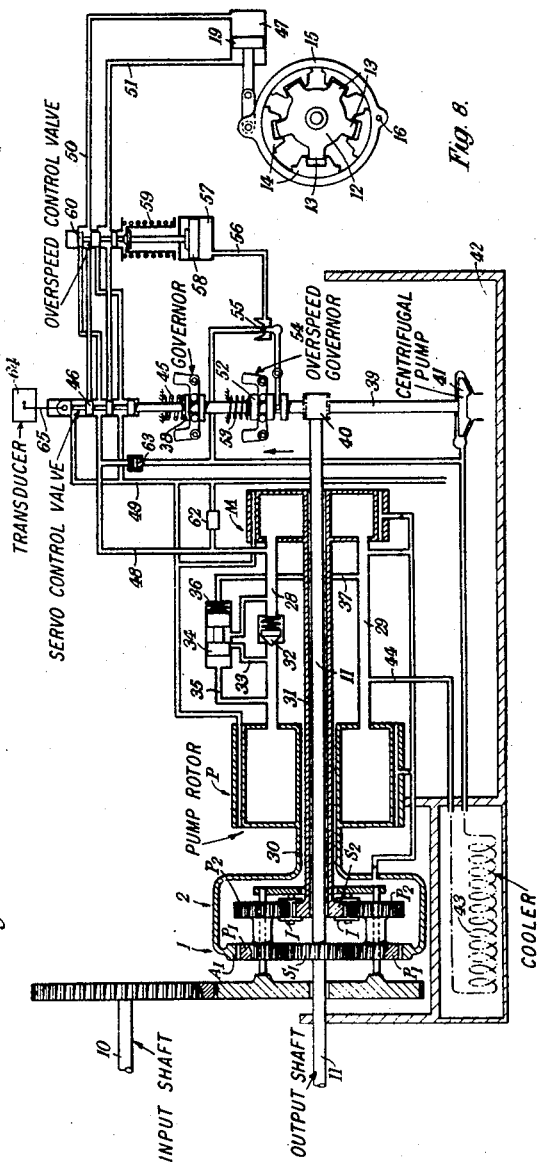

PUMP

MOTOR

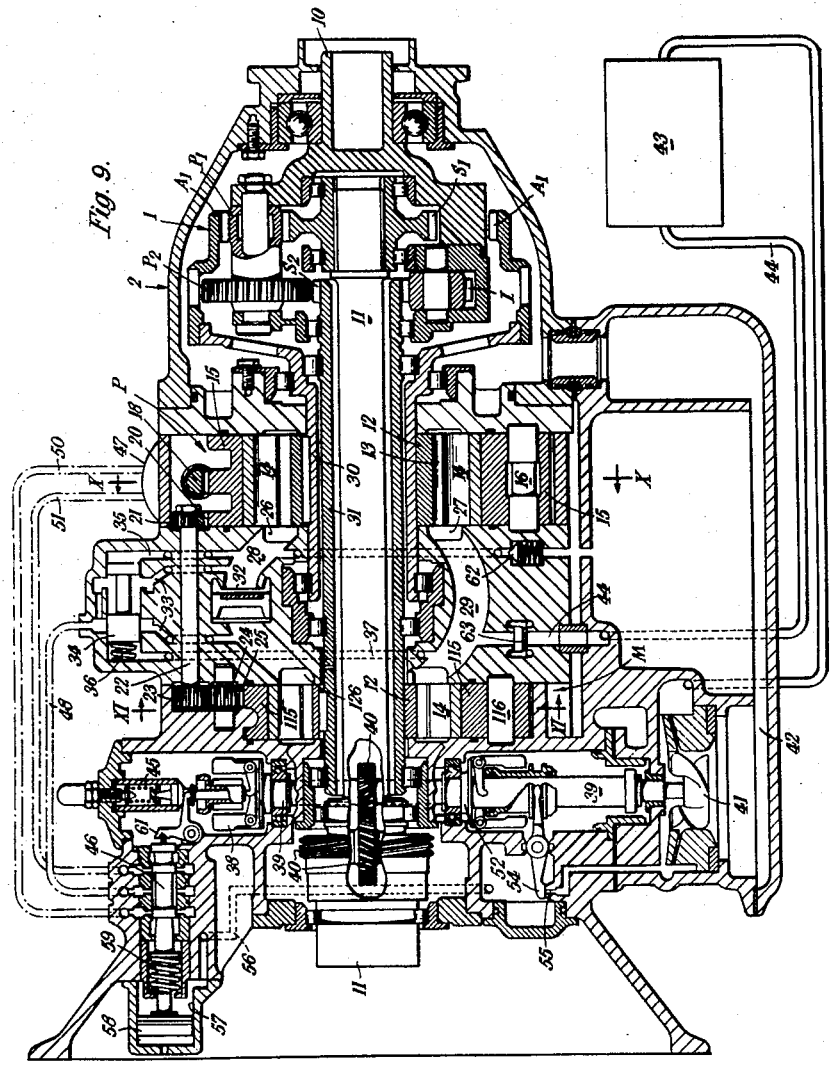

United States Patent Office 2,946,194
Patented July 26, 1960

2,946,194
CONSTANT SPEED UNITS

Roy Westbury, Bridgnorth, England, assignor to H. M. Hobson Limited, London, England, a British company Filed Jan. 14, 1959, Ser. No. 786,383

Claims priority, application Great Britain Jan. 14, 1958

4 Claims. (Cl. 60—53)

This invention relates to a hydraulic transmission for transmitting power from an input shaft to an output shaft of the type comprising a pair of variable displacement rotary hydraulic units coupled in a closed circuit so that one may transmit energy hydraulically to the other, the hydraulic units including control mechanisms for adjusting their displacement which are interlinked so that increase in the delivery of one unit is accompanied by a corresponding decrease in the delivery of the other unit, and a double differential gear comprising two portions, each connected to the input shaft, to the output shaft and to the rotor of one of the hydraulic units.

The invention has for its object to utilize such a hydraulic transmission to drive an output shaft at a constant speed irrespective of variations in rotational speed of the input shaft. This may be achieved by adjusting the control mechanisms by means of a governor sensitive to the rotational speed of the output shaft, in such a way that at a given input speed the displacement of the hydraulic unit which normally runs as a motor is zero and the displacement of the other hydraulic unit, which normally acts as a pump, is a maximum; while at a given higher input speed the displacement of the pump unit is zero and the displacement of the motor unit is at a high value.

Figure 1:
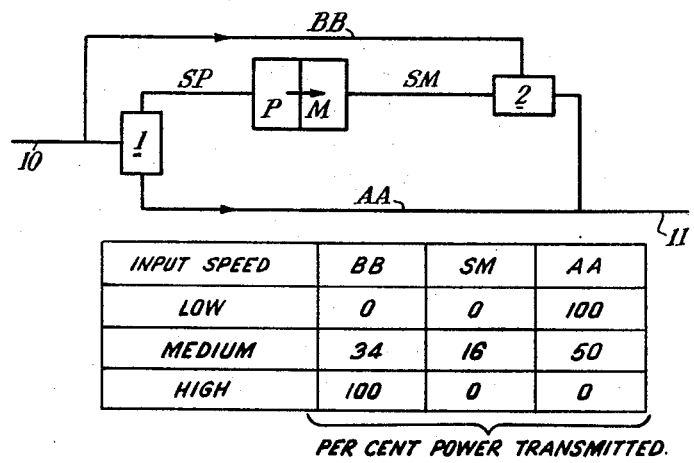
Figure 2:
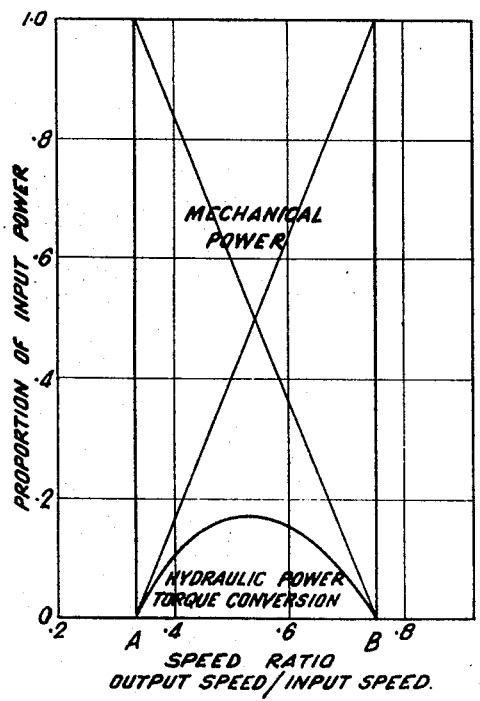

Such a constant speed device is shown diagrammatically in Fig. 1 of the accompanying drawings, its performance being indicated graphically in Fig. 2.

In Fig. 1, the input shaft 10 is shown coupled to the output shaft 11 by means of two differential gear boxes 1, 2 and a hydraulic transmission constituted by the pump and motor units P, M. Each of the gear boxes 1 and 2 provides a different degree of step-up ratio when its respective shaft SP or SM is locked. If the shaft SP is locked, the output shaft 11 will be driven at a speed corresponding to the point A in Figure 2, and the whole of the power is transmitted by the mechanical path AA. Alternatively if the shaft SM is locked, the output shaft 11 is driven under a condition corresponding to point B in Figure 2, and the whole of the power is transmitted by the other mechanical transmission path BB. At input speeds between A and B, power is transmitted by both mechanical paths AA, BB and also by a hydraulic transmission path. The hydraulic power utilized for torque conversion is indicated by the area beneath curve AB in Fig. 2.

The invention is particularly concerned with the provision of a constant speed device of this character suitable for driving an alternator at constant speed from the engine of an aircraft.

The losses associated with such a device are: (a) flow losses, (b) leakage losses, (c) mechanical friction losses, and the life of the bearings is a function of the working pressure in the hydraulic portion of the device. There are substantial advantages to be gained by arranging for the points A and B of zero hydraulic transmission to approximate the ground idling and cruising speeds of the engine respectively. The bulk of the power is then transmitted mechanically under the conditions which apply for most of the operating life of the engine.

Figure 3:
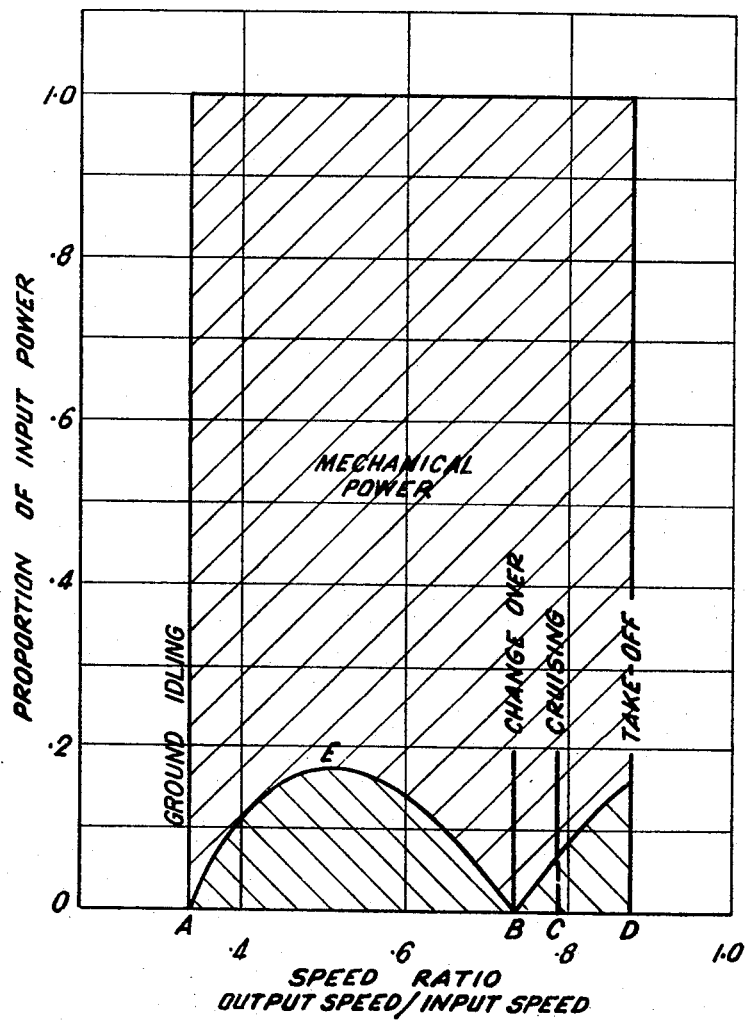

A typical graph for such a device is shown in Fig. 3 of the accompanying drawings. In the region of ground idling, represented substantially by the point A, the amount of liquid circulating through the hydraulic portion of the device is nil and the flow losses are nil. The leakage losses are substantially constant and the mechanical friction losses are small. As the working pressure is high, the bearing life is a minimum. Similar conditions occur at cruising, i.e. at point C. In the mid range at point E all losses are a maximum. While the overall losses are small the bearing life is a minimum, due to the high working pressures existing. Even at the point E the proportion of power transmitted hydraulically is small, e.g. 16%, consequently it is possible to operate at low hydraulic pressures of the order of 500 p.s.i. without excessive rates of flow in the hydraulic portion of the device and to utilize vane-type pump and motor units.

It will be noted that beyond the point B and from thence to the speed ratio D corresponding to take-off speed of the engine, the flow through the hydraulic portion of the unit reverses, the motor unit M acting as a pump to provide a small flow in the reverse direction to the pump unit P which then runs as a motor. At cruising speed, i.e. at the point C in Fig. 3, the motor unit M is rotating slowly in the reverse direction and the pump unit P is running nearly at full speed and pressure and nearly at zero delivery. The working pressure in the hydraulic portion of the device required to react the torque exerted on the motor unit M by the differential gear driving it coupled with the high speed of rotation of the pump unit P cause the bearings of the pump unit to deteriorate.

With a view to overcoming this disadvantage, the invention provides a torque convertor of the above type which includes a governor, and means controlled thereby for adjusting the control mechanisms of the hydraulic units so as to maintain substantially constant the speed of the output shaft. The displacement of the hydraulic unit acting as a motor tends to zero at a predetermined low input speed and the displacement of the hydraulic unit acting as a pump is rendered zero at a predetermined higher input speed, and means are provided for supporting the pressure which would otherwise act on the pump unit when the flow between the pump and motor units tends to reverse and permitting a restricted reverse flow between said units.

Figure 6:
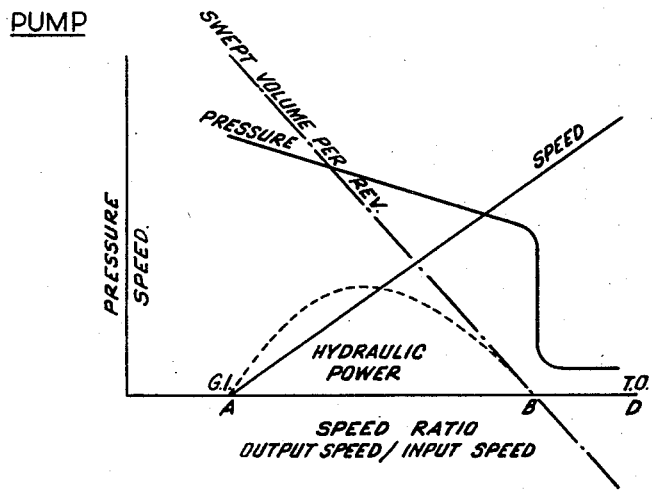
Figure 7:
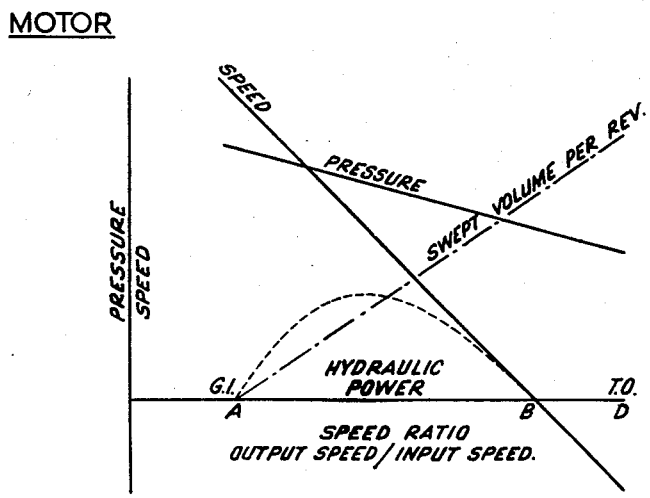
Figure 10:
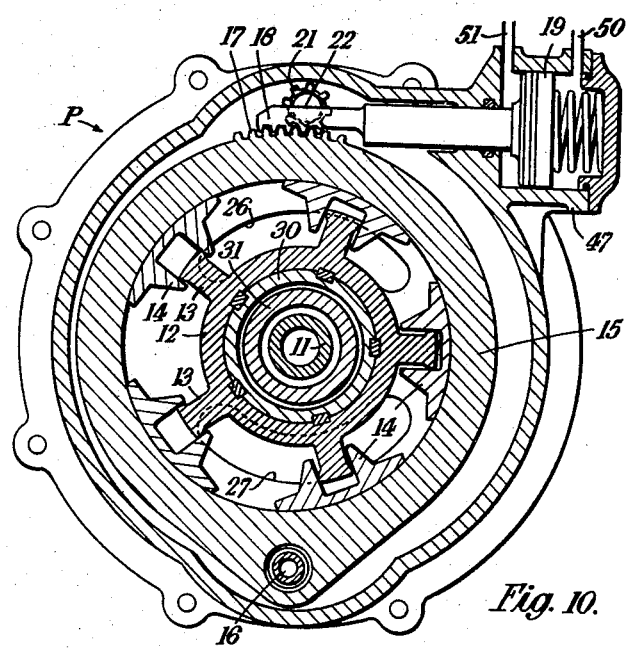
Figure 11:
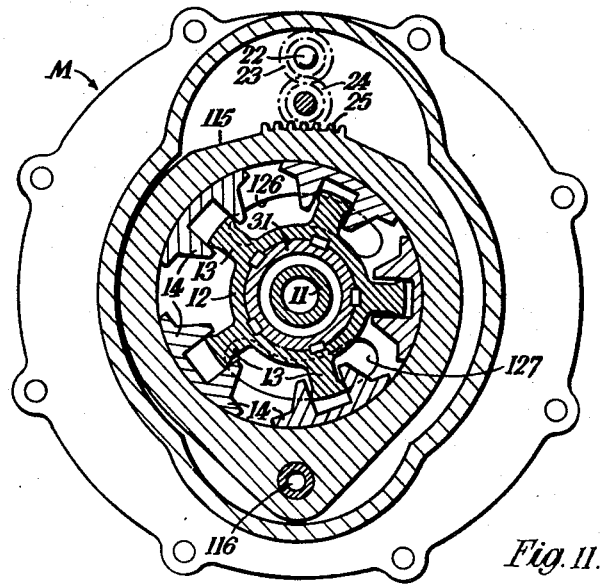

One preferred embodiment of constant speed device according to the invention will now be described in more detail, by way of example, with reference to the accompanying drawings, in which:

Figs. 1, 2 and 3 are the diagram and graphs already referred to,

Figs. 4 and 5 are diagrams illustrating the operation of unloading of the pressure on the pump bearings when the flow reverses, Figs. 6 and 7 are graphs showing respectively the performances of the pump and motor units under various conditions, Fig. 8 is a diagrammatic view of the complete apparatus, Fig. 9 is a longitudinal section through the complete apparatus in a practical form and Figs. 10 and 11 are respectively sections on the lines X—X and XI—XI in Fig. 9.

Like reference characters indicate like parts throughout the figures.

As indicated in Figs. 9, 10 and 11 the pump and motor units each comprise a vaned rotor 12 on the vanes 13 of which are rockably mounted slippers 14 coacting with an eccentric ring. The eccentric ring 15 (Fig. 10) of the pump P is pivoted at 16 to the pump casing and is formed with teeth 17 engaging a rack 18 on the piston rod of a servo piston 19 which controls the displacements of the pump and motor as later described. The ring 15 has further teeth 20 (Fig. 9) meshing with a gear 21 on a shaft 22, having at its other end a gear 23 meshing, via an intermediate gear 24 (Fig. 11), with teeth 25 on the eccentric ring 115 of the motor which is pivoted at 116 to the motor casing. On movement of the servo piston 19 the eccentric rings 15, 115 are accordingly rocked in opposite directions and to equal extents. Ports 26, 27 in the pump casing communicate with corresponding ports 126, 127 in the motor casing by passages 28, 29 respectively.

The differential gears indicated at 1, 2 in Fig. 1 are combined to form a double epicyclic gear train shown in detail in Figs. 8 and 9. By this design of gear train it is possible to reduce the overall speed ratio between the limits represented by the points AB (Figs. 2 and 3) to about 2.5:1.

The input shaft 10 is connected to a planet carrier carrying two sets of planet gears $P_1$, $P_2$ and a set of idler gears I. The planet gears $P_1$ mesh with an annulus $A_1$ connected by a hollow shaft 30 to the rotor of the pump P and with a sun wheel $S_1$, which is fixed to the output shaft 11. The planet gears $P_2$ mesh via the idler gears I with a sun wheel $S_2$ connected by a hollow shaft 31 to the rotor of the motor M.

At the point A (Figs. 2 and 3) the eccentricity of the eccentric ring 115 of the motor is zero and the pump P is hydraulically locked. The annulus $A_1$ is accordingly stationery, the output shaft being driven by the first gear train 1 through $P_1$, $S_1$ and the motor being rotated by the gears $P_2$, I, $S_2$. At the point B (Figs. 2 and 3) the eccentricity of the eccentric ring 15 of the pump is zero and the motor M is hydraulically locked. The sun wheel $S_2$ is stationery and the speed ratio is determined by the second gear train 2 and the wheels $P_1$, $S_1$, the pump being rotated by the annulus $A_1$. At points between A and B, the pump P acts as a pump, delivering liquid under pressure to the motor M along the passage 28, liquid returning from the motor to the pump along the passage 29. Under these conditions a non-return valve 32 in the passage 28 opens (see Fig. 4) to allow liquid to flow from the pump to the motor. In parallel with the passage 29 is a passage 33, normally closed by an unloading valve 34. When the non-return valve 32 is open (as shown in Fig. 9) the valve 34 is subject at one end, through a passage 35, to the pressure in the passage 28 and at the other to the pressure of a spring 36 and also, through a passage 37, to the pressure in the passage 29. When the input speed exceeds that indicated at B in Fig. 3, the flow reverses, the motor M acting as a pump and the pump P as a motor. As the result the non-return valve 32 closes as indicated in Fig. 5. When the valve 32 is closed at change-over and beyond, the valve 34 is subject to a reduced pressure on the pump side of the non-return valve 32. The consequent reduction of pressure in the passage 35 then causes the unloading valve 34 to move to its alternative position and open the passage 33 to allow restricted flow of liquid from M to P and therefore the maintenance of constant speed of the output shaft. When in the open position shown in Fig. 5, the unloading valve 34 supports the high pressure generated by the torque reaction at the motor M and isolates the pump from this high pressure.

Figs. 6 and 7 show the performance of the pump and motor and Fig. 6 illustrates the sharp drop in the pressure on the pump when reversal of flow occurs. The unloading of the pump is not achieved without some sacrifice because beyond the point B there is a small power wastage due to excess speed being converted into heat at the unloading valve. This power wastage is, however, fully justified by the elimination of high pressure within the pump at cruising speed.

Control of the servo piston 19 is effected by means of a flyweight governor 38 on a layshaft 39 driven, through worm gearing 40, from the output shaft 11. The shaft 39 also drives a centrifugal pump 41, which draws oil from a sump 42 and supplies it, via a cooler 43, to a line 44 communicating with the passage 29. This oil provides a cooling and make-up flow for the pump and motor. The governor 38, which is loaded by a spring 45, coacts with a servo control valve 46 which is movable from the neutral position shown in Fig. 8 to effect alternative connections between lines 50 and 51 leading to opposite ends of the servo cylinder 47 and pressure and exhaust lines 48, 49. When the output shaft 11 overspeeds, the governor 38 causes the servo piston 19 to move in the direction to increase the displacement of the pump and to decrease the displacement of the motor. The reverse action occurs when the output shaft underspeeds.

The layshaft 39 also drives an overspeed flyweight governor 52, loaded by a spring 53. In the event of the main governor 38 failing to operate and the output shaft 11 overspeeding by, say 10%, the governor 52 rocks a lever 54 to open a port 55 and admit liquid under pressure from the centrifugal pump 41 to a line 56 leading to a cylinder 57 containing an overspeed control piston 58, so moving the piston 58 against the action of a spring 59.

In Fig. 8 the piston 58 is shown connected to an overspeed control valve 60 separate from and in parallel to the main control valve 46 and movement of the piston 58 adjusts the valve 60 to cause the servo piston 19 to move in the direction to decrease the speed of the output shaft. In the practical construction shown in Fig. 9, however, the piston 58 is connected to the main control valve 46, on which the main governor 38 acts through a bell crank 61, and movement of the piston 58 to the left when the port 55 opens causes the valve 46 to move in the direction to cause the servo piston 19 to reduce the speed of the output shaft.

A relief valve 62 is provided to prevent the main circulating hydraulic pressure from exceeding a safe value and the line 48 is shown in Fig. 8 connected through a non-return valve 63 to the centrifugal pump 41 so that the latter may supply oil under pressure to the servo cylinder 47 when the main circulating pressure is less than the make-up pressure.

Where two or more alternators are operated in parallel, load synchronisation may be provided by means of an equalizing relay exerting some degree of control over the governor of the constant speed device driving each alternator. Thus, as shown in Fig. 8, an electromagnetic transducer 64 may be provided, with its armature spindle connected by a lever 65 to the control valve 46. Error signals from the alternator load equalizing circuits are passed through the relay coils of the transducer 64, resulting in a force in the appropriate sense being passed to the valve 46 to adjust it to cause equal load sharing between the alternators.

The apparatus described is capable of driving an alternator at a constant speed of 6,000 r.p.m. ±1% from an aircraft engine providing an input speed range of 2740–7000 r.p.m.

What I claim as my invention and desire to secure by Letters Patent is:

1. A hydraulic transmission for transmitting power from an input shaft to an output shaft to drive said output shaft at constant speed notwithstanding variations in speed of said input shaft, said transmission comprising a pair of variable displacement rotary hydraulic units coupled in a closed circuit so that one may transmit energy hydraulically to the other and connected so that their displacements are varied inversely, a double differential gear system comprising two portions, each connected to the input shaft, to the output shaft and to one of said hydraulic units, one of said units being operatively connected to the input shaft by said gear system and normally running as a pump and the other of said units being operatively connected to the output shaft by said gear system and normally running as a motor, said pump and motor units reversing their functions when the ratio of the speed of the output shaft to the speed of the input shaft exceeds a predetermined value, a governor driven by the output shaft for controlling the displacement of said units, and means for relieving said pump unit of hydraulic pressure when fluid tends to flow from said motor unit to said pump unit at speed ratios above said predetermined value.

2. A hydraulic transmission for transmitting power from an input shaft to an output shaft to drive said output shaft at constant speed notwithstanding variations in speed of said input shaft, said transmission comprising a pair of variable displacement rotary hydraulic units coupled in a closed circuit so that one may transmit energy hydraulically to the other and connected so that their displacements are varied inversely, a double differential gear system comprising two portions, each connected to the input shaft, to the output shaft and to one of said hydraulic units, one of said units being operatively connected to the input shaft by said gear system and normally running as a pump and the other of said units being operatively connected to the output shaft by said gear system and normally running as a motor, said pump and motor units reversing their functions when the ratio of the speed of the output shaft to the speed of the input shaft exceeds a predetermined value, a governor driven by the output shaft for controlling the displacement of said units, a normally open non-return valve in a first passage permitting a flow of fluid from said pump unit to said motor unit, and a normally closed unloading valve in a second passage in parallel to said first passage, said unloading valve being subject to pressure conditions in said first passage and opening to permit restricted reverse flow of fluid through the second passage from the motor unit to the pump unit whenever said non-return valve closes.

3. A hydraulic transmission according to claim 2, wherein the pump and motor units have vaned rotors carrying slippers coacting with eccentric rings which are adjustable in opposite senses by a servo mechanism controlled by the governor.

4. A hydraulic transmission according to claim 3, comprising an overspeed governor driven by the output shaft and coupled to said servo mechanism, said overspeed governor actuating said servo mechanism to reduce the speed of the output shaft in the event of failure of said first mentioned governor.

References Cited in the file of this patent

UNITED STATES PATENTS

| | | |
|---|---|---|
| 2,344,115 | Sturm | Mar. 14, 1944 |
| 2,666,293 | Vigneau | Jan. 19, 1954 |
| 2,765,623 | Nübling | Oct. 9, 1956 |